(12) United States Patent
Hirata

(10) Patent No.: US 11,704,283 B2
(45) Date of Patent: Jul. 18, 2023

(54) INFORMATION PROCESSING APPARATUS AND NON-TRANSITORY COMPUTER READABLE MEDIUM STORING COMPUTER PROGRAM

(71) Applicant: FUJIFILM Business Innovation Corp., Tokyo (JP)

(72) Inventor: Motoharu Hirata, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/783,171

(22) Filed: Feb. 6, 2020

(65) Prior Publication Data

US 2021/0081360 A1 Mar. 18, 2021

(30) Foreign Application Priority Data

Sep. 18, 2019 (JP) ................................. 2019-169396

(51) Int. Cl.
*G06F 16/16* (2019.01)
*G06F 16/93* (2019.01)
*G06F 16/14* (2019.01)

(52) U.S. Cl.
CPC .......... *G06F 16/168* (2019.01); *G06F 16/156* (2019.01); *G06F 16/93* (2019.01)

(58) Field of Classification Search
CPC ....... G06F 16/168; G06F 16/93; G06F 16/156
See application file for complete search history.

(56) References Cited

U.S. PATENT DOCUMENTS 10,198,355 B2 * 2/2019 Haven ................. G06F 12/0813
11,190,654 B2 11/2021 Tsukada 2003/0132969 A1 * 7/2003 Tanaka .................... G06F 16/58 707/E17.026
2007/0058552 A1 * 3/2007 Miyoshi ................ G06F 13/387 370/242
2011/0083140 A1 * 4/2011 Kim .................... H04N 21/4821 725/28
2015/0172364 A1 * 6/2015 Toyoda ............... G06F 3/04817 715/719

FOREIGN PATENT DOCUMENTS

| JP | 2003208428 | 7/2003 |
|---|---|---|
| JP | 2006253751 | 9/2006 |
| JP | 2008233194 | 10/2008 |
| JP | 2010182256 | 8/2010 |
| JP | 2016010094 | 1/2016 |
| JP | 2016036932 | 3/2016 |
| JP | 2019125886 | 7/2019 |

OTHER PUBLICATIONS

"Notice of Reasons for Refusal of Japan Counterpart Application", dated May 23, 2023, with English translation thereof, p. 1-p. 8.

* cited by examiner

*Primary Examiner* — Kannan Shanmugasundaram

(74) *Attorney, Agent, or Firm* — JCIPRNET

(57) ABSTRACT

An information processing apparatus includes a processor configured to generate a preview image used for previewing content data, present a reason why there is no preview image, in a case where an operation related to display of the preview image is received for the content data which does not have the preview image, and allow reception of a preview image creation instruction from a user, for content data which does not have the preview image and satisfies a first condition.

21 Claims, 12 Drawing Sheets

| CONTENT TYPE | PREVIEW DISPLAY TARGET |
|---|---|
| pdf | TARGET |
| xdw | NON-TARGET |

| CABINET IDENTIFIER | FREE SPACE |
|---|---|
| cabinet001 | PRESENCE |
| cabinet002 | PRESENCE |

| DRAWER IDENTIFIER | FREE SPACE | PREVIEW DISPLAY |
|---|---|---|
| drawer001 | PRESENCE | INVALID |
| drawer002 | ABSENCE (INSUFFICIENT) | VALID |

FIG.7

| DOCUMENT IDENTIFIER | DOCUMENT DATA (CONTENT) | STORAGE DESTINATION DRAWER | CONTENT TYPE | ACCESS RIGHT (PREVIEW IMAGE CREATION/DISPLAY) |
|---|---|---|---|---|
| doc001 | ABSENCE | drawer001 | - | USER C: PRESENCE |
| doc002 | {BINARY DATA OF doc002} | drawer002 | pdf | USER C: ABSENCE |
| doc003 | {BINARY DATA OF doc003} | drawer002 | pdf | USER C: PRESENCE |

| DOCUMENT IDENTIFIER | PREVIEW IMAGE DATA | STATUS |
|---|---|---|
| doc001 | — | NOT-CREATED |
| doc002 | { – doc002 } | HAS BEEN CREATED |
| doc003 | — | NOT-CREATED (NOT BEING CREATED) |

115

INFORMATION PROCESSING APPARATUS AND NON-TRANSITORY COMPUTER READABLE MEDIUM STORING COMPUTER PROGRAM

CROSS-REFERENCE TO RELATED APPLICATIONS

This application is based on and claims priority under 35 USC 119 from Japanese Patent Application No. 2019-169396 filed Sep. 18, 2019.

BACKGROUND

(i) Technical Field

The present invention relates to an information processing apparatus and a non-transitory computer readable medium storing a computer program.

(ii) Related Art

JP2010-182256A discloses a display device including identification information acquisition means for acquiring identification information indicating association of each image given in advance to each of a plurality of images, the identification information given to the image displayed on display means; mark image data storage means for storing mark image data indicating mark indicating a display mode of one or more other images related to the displayed image, the mark being generated based on display mode information indicating the display mode associated with the obtained identification information; and display control means for displaying a mark based on the stored mark image data together with an image to be displayed on the display means.

SUMMARY

In displaying a preview image on a display device, there is a technique in which a preview image for each magnification is prepared in advance and each preview image is displayed in response to a user request. In a configuration in which the user can view only the preview image prepared in advance, in a case where the preview image is not prepared, the user cannot view the preview image, and even in a case where the user wants to create the preview image, it is not possible to instruct creation.

Aspects of non-limiting embodiments of the present disclosure relate to an information processing apparatus and a non-transitory computer readable medium storing a computer program that can improve the degree of freedom of viewing a preview image, as compared with a case where a user can view only a preview image prepared in advance.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to generate a preview image used for previewing content data, present a reason why there is no preview image, in a case where an operation related to display of the preview image is received for the content data which does not have the preview image, and allow reception of a preview image creation instruction from a user, for content data which does not have the preview image and satisfies a first condition.

BRIEF DESCRIPTION OF THE DRAWINGS

Exemplary embodiment(s) of the present invention will be described in detail based on the following figures, wherein:

FIG. 4 is a diagram illustrating an example of data in an office setting DB;

FIG. 5 is a diagram illustrating an example of data in a cabinet DB;

FIG. 6 is a diagram illustrating an example of data in a drawer DB;

FIG. 7 is a diagram illustrating an example of data in a document DB;

FIG. 8 is a diagram illustrating an example of data in a preview image DB;

DETAILED DESCRIPTION

Figure 1:
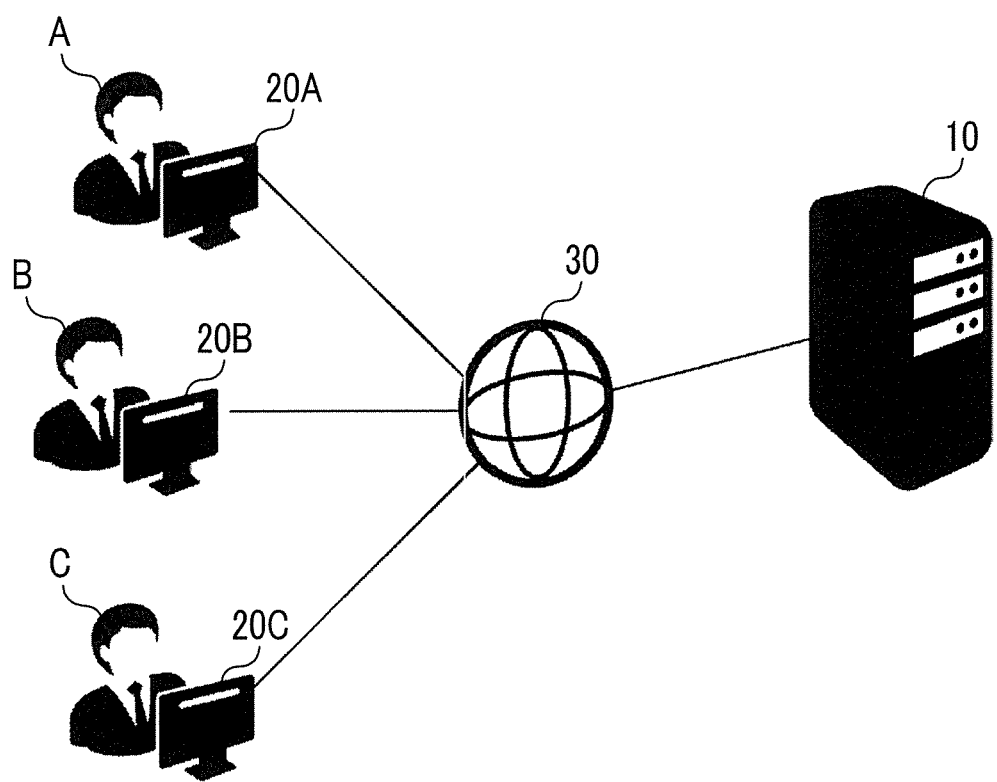
FIG. 1 is a diagram illustrating a schematic configuration of a document management system according to the present exemplary embodiment.

Hereinafter, an example of an exemplary embodiment of the present invention will be described with reference to the drawings. In the drawings, the identical or equivalent components and parts are denoted by the identical reference numerals. Further, the dimensional proportions in the drawings are exaggerated for the convenience of the description, and may differ from the actual proportions.

FIG. 1 is a diagram showing a schematic configuration of a document management system according to the present exemplary embodiment. The document management system shown in FIG. 1 includes a document management server 10 as an information processing apparatus and user terminals 20A to 20C. The document management server 10 and the user terminals 20A to 20C are connected to each other by a communication line 30 such as the Internet or an intranet. The user terminals 20A to 20C are collectively referred to as a user terminal 20. The communication line 30 may be a wired line or a wireless line, and may be a dedicated line used only by a specific user or a public line in which the identical line is shared by an unspecified number of users.

The document management server 10 stores document data that is an example of content data. Document data is referred to as digital data that is a document entity. The document management server 10 provides document data in response to a request from the user. The document management server 10 not only provides document data to the user terminal 20 but also displays a preview image generated from the document data on the screen of the user terminal 20. In the present exemplary embodiment, the preview image is an image used for previewing document data stored in the document management server 10.

The user terminals 20A to 20C are terminals used by the users of the document management system, and may be any terminal such as a desktop computer, a notebook computer, a tablet, or a smartphone. In FIG. 1, it is assumed that user A is using a user terminal 20A, user B is using a user terminal 20B, and user C is using a user terminal 20C. The user terminals 20A to 20C are collectively referred to as a user terminal 20.

In the following description, it is assumed that the user A is a user who registers document data in the document management server 10, and the user B is a user who requests the document management server 10 to generate a preview image of the document data registered in the document management server 10. The user C is assumed to be a user who desires to view the preview image generated by the document management server 10. The user A registers the document data in the document management server 10 using the user terminal 20A. The user B uses the user terminal 20B to instruct the document management server 10 to create a preview image of the document data. The user C uses the user terminal 20C to view a preview image of document data stored in the document management server 10.

Of course, the user A and the user B may be the identical user, the user A and the user C may be the identical user, and the user B and the user C may be the identical user. The user A, the user B, and the user C may be the identical user.

In the present exemplary embodiment, the preview image is an image displayed on a Web browser and other software for displaying the contents of the document data stored in the document management server 10 or editing information added to the document data. The preview image according to the present exemplary embodiment is an image that is restricted such that the user cannot perform operations such as downloading, editing, or uploading by the user.

Figure 2:
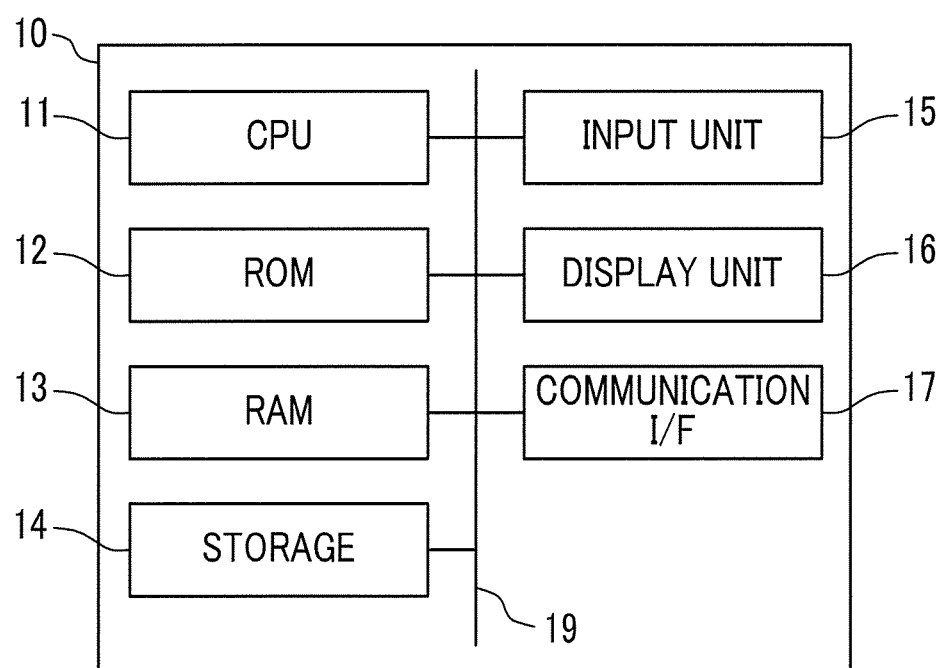
FIG. 2 is a block diagram illustrating a hardware configuration of a document management server.

FIG. 2 is a block diagram illustrating a hardware configuration of the document management server 10.

As shown in FIG. 2, the document management server 10 includes a central processing unit (CPU) 11, a read only memory (ROM) 12, a random access memory (RAM) 13, a storage 14, an input unit 15, a display unit 16, and a communication interface (I/F) 17. The respective components are communicably connected to each other through a bus 19.

The CPU 11 is a central processing unit, and executes various programs or controls each part. That is, the CPU 11 reads a program from the ROM 12 or the storage 14, and executes the program using the RAM 13 as a work area. The CPU 11 controls the above-described components and performs various arithmetic processing in accordance with the program stored in the ROM 12 or the storage 14. In the present exemplary embodiment, the ROM 12 or the storage 14 stores a document management program for managing document data.

The ROM 12 stores various programs and various data. The RAM 13 as a work area temporarily stores a program or data. The storage 14 is a storage device such as a hard disk drive (HDD), a solid state drive (SSD), or a flash memory, and stores various programs including an operating system, and various data.

The input unit 15 includes a pointing device such as a mouse and a keyboard, and is used to perform various inputs.

The display unit 16 is, for example, a liquid crystal display, and displays various types of information. The display unit 16 may function as the input unit 15 by adopting a touch panel method.

The communication interface 17 is an interface for communicating with another device such as the user terminal 20 or the like, and for example, a standard such as Ethernet (registered trademark), FDDI, Wi-Fi (registered trademark) or the like is used.

Next, the functional configuration of the document management server 10 will be described.

Figure 3:
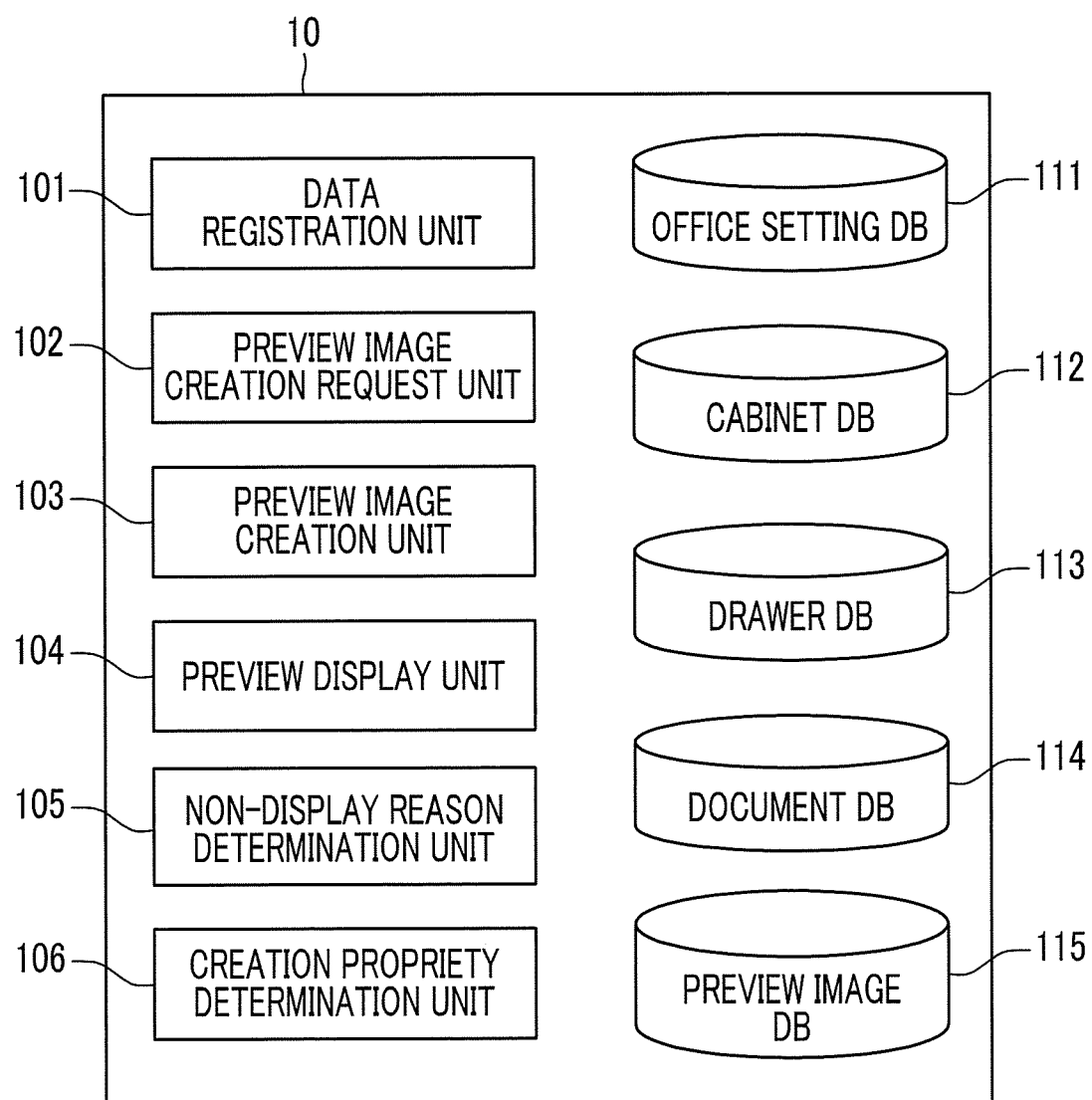
FIG. 3 is a block diagram illustrating an example of a functional configuration of the document management server.

FIG. 3 is a block diagram illustrating an example of a functional configuration of the document management server 10.

As illustrated in FIG. 3, the document management server 10 includes a data registration unit 101, a preview image creation request unit 102, a preview image creation unit 103, a preview display unit 104, a non-display reason determination unit 105, and a creation possibility determination unit 106, as functional configuration. Each functional configuration is realized by the CPU 11 reading and executing the document management program stored in the ROM 12 or the storage 14. As shown in FIG. 3, the document management server 10 includes an office setting database (DB) 111, a cabinet DB 112, a drawer DB 113, a document DB 114, and a preview image DB 115. The office setting DB 111, the cabinet DB 112, the drawer DB 113, the document DB 114, and the preview image DB 115 can be generated in the storage 14, for example.

The document management server 10 according to the present exemplary embodiment manages document data in a hierarchy of three objects. In the present exemplary embodiment, the highest-level object is called "office", the object under "office" is called "cabinet", and the object under "cabinet" is called "drawer". "Office" is, for example, an object created for each contract of the document management system. The "cabinet" can be generated one or more directly under the "office", and is an object for managing documents. The "drawer" is an object for managing documents that can be generated one or more directly under the "cabinet". Each piece of document data is stored in the "drawer".

Usually, "DB" means an abbreviation of "database" that manages data in association with a predetermined primary key. However, "DB" in the present exemplary embodiment does not indicate various commercial and non-commercial database applications, but represents a storage area for storing data. Needless to say, a database application may be used to manage a storage area for storing data.

The data registration unit 101 registers or updates document data, based on a document data registration request from a user, for example, the user A. The data registration unit 101 stores the document data in the document DB 114, based on the settings registered in the office setting DB 111, the cabinet DB 112, and the drawer DB 113. In a case where the document data is registered or updated, the data registration unit 101 transmits a preview image creation instruction to the preview image creation unit 103, based on the settings registered in the office setting DB 111, the cabinet DB 112, and the drawer DB 113. To the data registration unit 101, in a case where document data is registered, document data is input, and in a case where document data is updated, document data and a document identifier for uniquely identifying the document data are input. Then, the data registration unit 101 outputs document data for creating a preview image and a document identifier of the document data to the preview image creation unit 103 as a preview image creation instruction.

In a case where the preview image can be created with reference to the settings registered in the office setting DB 111, the cabinet DB 112, and the drawer DB 113, the data registration unit 101 outputs a preview image creation instruction to the preview image creation unit 103, in a case of registering or updating the document data. On the other hand, in a case where the preview image cannot be created with reference to the settings registered in the office setting DB 111, the cabinet DB 112, and the drawer DB 113, the data registration unit 101 does not output a preview image creation instruction to the preview image creation unit 103, in a case of registering or updating the document data.

The preview image creation request unit 102 transmits, to the preview image creation unit 103, an instruction to create a preview image of the document data stored in the document DB 114, based on a preview image creation request from a user, for example, user B. A document identifier for uniquely identifying document data is input to the preview image creation request unit 102. Then, the preview image creation request unit 102 outputs document data for creating a preview image and a document identifier of the document data to the preview image creation unit 103 as a preview image creation instruction.

The preview image creation unit 103 creates a preview image of document data stored in the document DB 114. The preview image creation unit 103 creates a preview image of document data, based on a preview image creation instruction from the data registration unit 101 or the preview image creation request unit 102. To the preview image creation unit 103, document data for creating a preview image and a document identifier of the document data are input. Then, the preview image creation unit 103 outputs the created preview image and the input document identifier, to the preview image DB 115.

The preview display unit 104 performs preview image display processing in response to reception of an operation related to display of a preview image from the user, for example, the user C. Examples of the operation related to the display of the preview image include selection of document data for which the preview image is to be displayed. Examples of the operation related to the display of the preview image include an operation that explicitly instructs the display of the preview image. The operation related to the display of the preview image may be, for example, a mouse double-click operation on one line in the document data information displayed in a list. The operation related to the display of the preview image may be an operation for explicitly instructing the display of the preview image, which is performed after a selection operation such as a single click on one of the document data information pieces displayed in the list. The preview display unit 104 receives a document identifier of document data for which a preview image is to be displayed. Then, the preview display unit 104 outputs a preview image corresponding to the input document identifier and displays the preview image on the user, for example, the user terminal 20C of the user C.

In a case where the preview display unit 104 receives an operation related to viewing of the preview image from the user, and the preview image is not displayed for some reason, the preview display unit 104 transmits an instruction to determine why the preview image is not displayed to the non-display reason determination unit 105. Examples of the reason why the preview image is not displayed include a case where the preview image has not been created, or a case where the user does not have the right to access document data (the right to create and display the preview image). In a case where the preview display unit 104 acquires the reason why the preview image is not displayed, from the non-display reason determination unit 105, the preview display unit 104 transmits an instruction to determine whether the preview image can be created, to the creation possibility determination unit 106. In a case where the preview image cannot be displayed for some reason, the preview display unit 104 displays the reason why the preview image is not displayed, which is acquired from the non-display reason determination unit 105, for example, on the user terminal 20C of a user, for example, the user C. Further, in a case where the user is authorized to display the preview image and the user can create the preview image, the preview display unit 104 displays a user interface for creating a preview image on a user, for example, the user terminal 20C of the user C.

In a case where the preview image cannot be displayed for some reason, the non-display reason determination unit 105 determines the reason why the preview image is not displayed, and transmits the reason why the preview image is not displayed to the preview display unit 104. A document identifier is input to the non-display reason determination unit 105. The non-display reason determination unit 105 outputs the reason for non-display of the preview image of the document data corresponding to the input document identifier. The determination flow of the reason for non-display of the preview image by the non-display reason determination unit 105 will be described later.

The creation possibility determination unit 106 determines whether a preview image can be created by the user. The creation possibility determination unit 106 determines that a preview image can be created for document data that satisfies a predetermined condition (first condition). The document data that satisfies the first condition may be, for example, document data of which a preview image has not been created and the preview image can be displayed and generated. The document data that satisfies the first condition may be, for example, document data stored in an area where the display of the preview image is valid. The document data that satisfies the first condition may be, for example, document data of a type that permits creation of a preview image as a preview image display target. The document data that satisfies the first condition may be, for example, document data for which a user who have given an instruction to display a preview image is authorized to view the preview image.

In a case where the creation possibility determination unit 106 determines that the user is authorized to display the preview image and the user can create the preview image, the preview display unit 104 displays, on the user terminal 20, a user interface for allowing the reception of the preview image creation instruction. The reason for non-display of the preview image is input to the creation possibility determination unit 106. The creation possibility determination unit 106 outputs information regarding whether or not the user can create a preview image. A determination flow for determining whether or not the user can create a preview image by the creation possibility determination unit 106 will be described later.

The office setting DB 111 is a database that stores the setting of "office" that is the highest-level object. FIG. 4 is a diagram illustrating an example of data in the office setting DB 111. The office setting DB 111 stores content types and settings as to whether or not each content type is to display a preview image.

The cabinet DB 112 is a database that stores information on "cabinet", which is an object under "office". FIG. 5 is a diagram illustrating an example of data in the cabinet DB 112. The cabinet DB 112 stores a cabinet identifier for identifying a cabinet, and information on the presence or absence of free space in the cabinet corresponding to the cabinet identifier. The cabinet DB 112 may store free space information as a specific numerical value, for example, a free space value or a ratio of the free space to the total space.

The drawer DB 113 is a database that stores information on "drawer", which is an object under the "cabinet". FIG. 6 is a diagram illustrating an example of data in the drawer DB 113. The drawer DB 113 stores a drawer identifier for identifying a drawer, and information on the presence or absence of free space in the drawer corresponding to the drawer identifier. The drawer DB 113 may store free space information as a specific numerical value, for example, a free space value or a ratio of the free space to the total space.

The document DB 114 is a database that stores information on each piece of document data stored in the drawer. FIG. 7 is a diagram illustrating an example of data in the document DB 114. The document DB 114 stores information such as a document identifier for uniquely identifying document data, content (binary data) as the document data entity, a storage destination drawer, a content type, and access right. There may be a case where there is document identifier information but no content (binary data). The first line of the document DB 114 shown in FIG. 7 is an example of information in a case where there is document identifier information but no content.

The preview image DB 115 is a database that stores information on each preview image corresponding to each document data. FIG. 8 is a diagram illustrating an example of the preview image DB 115. The preview image DB 115 stores a document identifier for uniquely identifying document data, preview image data generated from the document data, and preview image status information. The preview image DB 115 has a record corresponding to the document data corresponding to the document identifier. In the example of FIG. 8, each document data is configured to have one preview image data for convenience, but may be configured to have preview image data for each page. In the preview image DB 115, three types of information, that is, created, not created, and not created (not being created) are set as the preview image status information.

The preview image creation unit 103 may automatically delete a preview image that satisfies a predetermined condition (second condition). The preview image that satisfies the second condition may be, for example, a preview image generated before a predetermined time range. The preview image that satisfies the second condition may be, for example, a preview image whose last referenced time is before a predetermined time range.

In addition, the preview image creation unit 103 may receive, from the user terminal 20, an instruction to delete a preview image that satisfies a predetermined condition (third condition). The preview image that satisfies the third con-dition may be, for example, document data that is a display target of the preview image, and may be a preview image that is generated from document data of a type that permits creation of the preview image. The preview image that satisfies the third condition may be, for example, a preview image whose last referenced time is before a predetermined time range.

Further, the preview image creation unit 103 may determine whether to generate a preview image, based on a predetermined condition (fourth condition), for newly registered or updated document data. For example, the fourth condition may be that the generation of the preview image is permitted in a case where the drawer in which the document data is stored permits the generation of the preview image. For example, the fourth condition may be that the generation of the preview image is permitted in a case where the free space of the drawer storing the document data is equal to or larger than a predetermined threshold.

Next, the action of the document management server 10 will be described.

Figure 9:
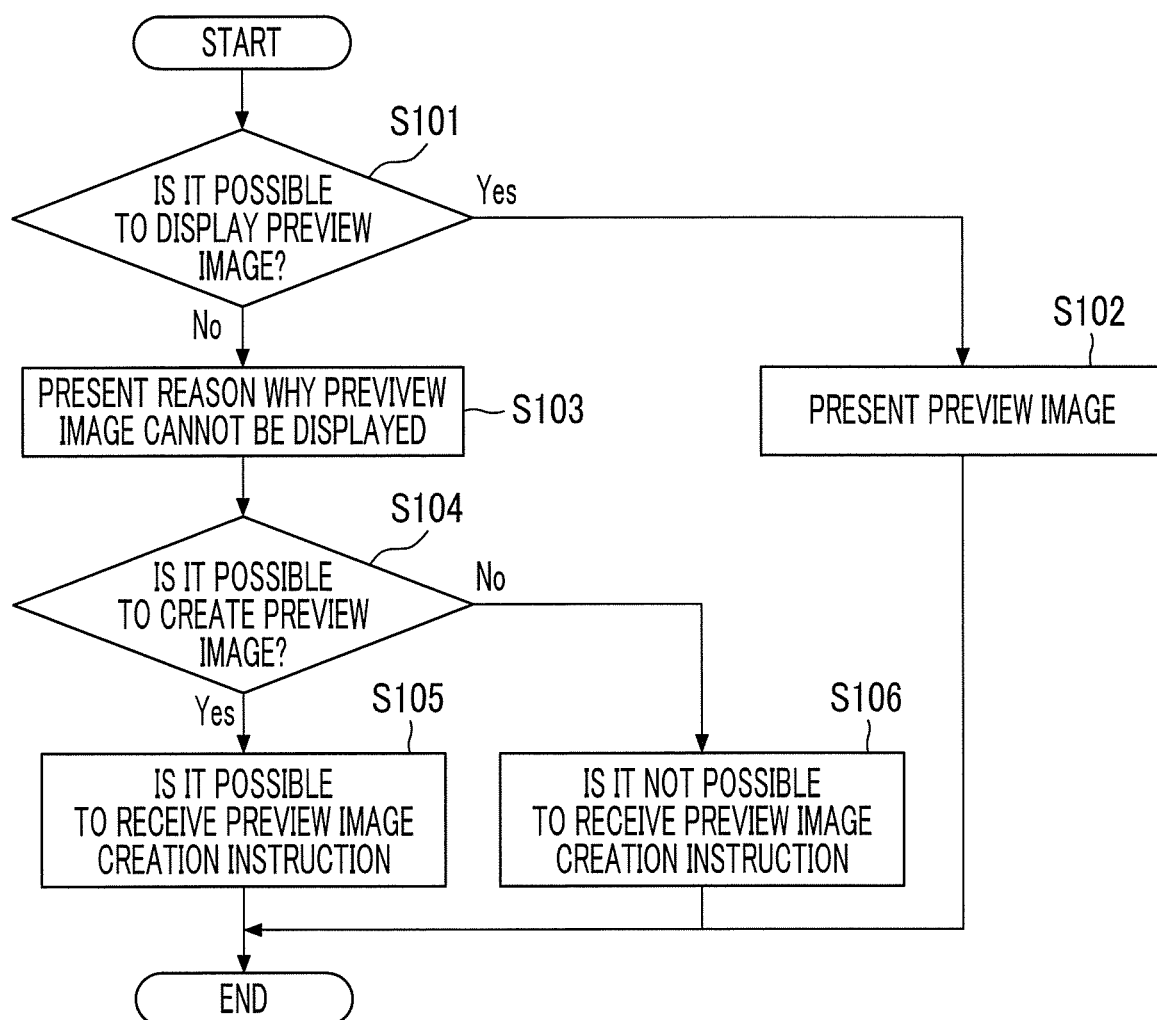
FIG. 9 is a flowchart illustrating a flow of preview image display processing by the document management server.

FIG. 9 is a flowchart illustrating a flow of preview image display processing by the document management server 10. The preview image display processing is executed by the CPU 11 reading the document management program stored in the ROM 12 or the storage 14, developing the program in the RAM 13, and executing the program.

Hereinafter, an operation example of the document management server 10 in a case where the user C uses the user terminal 20C to view a preview image of document data stored in the document management server 10 will be described.

In a case where the operation related to the display of the preview image of the document data is received from the user C, the CPU 11 determines whether or not the preview image can be displayed (step S101). In a case where it is determined that the preview image can be displayed (step S101: Yes), the CPU 11 acquires a preview image of the document data designated by the user C from the preview image DB 115, and presents the acquired preview image to the user terminal 20C (step S102). On the other hand, in a case where it is determined that the preview image cannot be displayed (step S101: No), the CPU 11 acquires the reason why the preview image cannot be displayed, and presents the reason why the preview image cannot be displayed to the user terminal 20C (step S103).

Following step S103, the CPU 11 determines whether a preview image can be created (step S104). For example, in a case where the content type is a content type that can generate a preview image and the user C is permitted to view the preview image of the document data, but the preview image is not generated, the CPU 11 determines that the preview image can be created.

In a case of determining that a preview image can be created (step S104: Yes), the CPU 11 presents a user interface for allowing reception of a preview image creation instruction to the user terminal 20C (step S105). On the other hand, in a case of determining that the preview image cannot be created (step S104: No), the CPU 11 presents a user interface for not allowing reception of a preview image creation instruction, to the user terminal 20C (step S106). The presentation of the user interface for allowing reception of a preview image creation instruction may be, for example, display of a button for receiving a preview image creation instruction. The user interface for not allowing reception of a preview image creation instruction may be, for example, to hide a button for receiving a preview image creation instruction, or to display the button such that cannot be selected.

Next, an example of determining the reason why the preview image cannot be displayed and an example of determining whether a preview image can be created, by the CPU 11, will be described.

Case where the Preview Image Cannot be Displayed Due to Drawer Setting

Case where the Preview Image Cannot be Displayed Due to Drawer Setting

In a case where the display of the preview image is not set to valid originally, with respect to the drawer storing the document data designated by the user C, the preview image cannot be displayed on the user terminal 20C. Therefore, the CPU 11 first refers to the drawer DB 113 to determine whether or not the display of the preview image is set to valid, with respect to the drawer storing the document data designated by the user C. In a case where the CPU 11 refers to the drawer DB 113 and the display of the preview image is set to be invalid, the CPU 11 presents, to the user terminal 20C, a message such as "Preview image cannot be displayed because the display of the preview image in the drawer is invalid.", for example, as the reason why the preview image cannot be displayed.

For example, it is assumed that the user C designates the document data of the document identifier "doc001" in the document DB 114 of FIG. 7. Referring to the document DB 114, the drawer in which the document data is stored is "drawer001". Referring to the drawer DB 113 in FIG. 6, the display of the preview image in the drawer is set to "invalid". Therefore, in a case where the user C designates the document data with the document identifier "doc001", the CPU 11 presents, to the user terminal 20C, a message such as "Preview image cannot be displayed because the display of the preview image in the drawer is invalid."

Case where the Preview Image Cannot be Displayed Because the Document Data Entity does not Exist In a case where the display of the preview image is set to valid, the CPU 11 refers to the document DB 114 to determine whether or not the entity of the document data designated by the user C exists. In a case where the CPU 11 refers to the document DB 114 and the document data entity does not exist, the CPU 11 presents, to the user terminal 20C, a message such as "Preview image cannot be displayed because the content of the document does not exist.", for example, as the reason why the preview image cannot be displayed.

Case where the Preview Image Cannot be Displayed Because the Document Data is not the Display Target of the Preview Image In a case where the document data entity exists, the CPU 11 refers to the office setting DB 111 to determine whether or not the document data designated by the user C is of a content type for which a preview image is to be displayed. In a case where the CPU 11 refers to the office setting DB 111 and the content type is not to display the preview image, the CPU 11 presents, to the user terminal 20C, a message such as "Preview image cannot be displayed because the content type of the document is designated as the target.", for example, as the reason why the preview image cannot be displayed.

Case where the Preview Image Cannot be Displayed Because there is No Access Right In a case where the document data entity exists, and the CPU 11 refers to the office setting DB 111 to determine that the document data is of the content type for which a preview image is to be displayed, the CPU 11 refers to the document DB 119 to determine whether or not the user C has a right to access the preview image of the document data. Having the right to access a preview image means having the right to view the preview image and the right to create the preview image. In a case where the CPU 11 refers to the document DB 114 and the user C does not have the access right to the preview image of the document data, the CPU 11 presents, to the user terminal 20C, a message such as "Preview image cannot be displayed because there is no access right", as the reason why the preview image cannot be displayed.

Case where the Preview Image Cannot be Displayed Because the Preview Image is being Created or has not been Created In a case where there is an access right to the preview image, the CPU 11 refers to the preview image DB 115 to determine whether the preview image is being created or is not being created. In a case where the CPU 11 refers to the preview image DB 115 and a preview image is being created, the CPU 11 presents, to the user terminal 20C, a message such as "Preview image cannot be displayed because a preview image is being created. Please access again later." as the reason why the preview image cannot be displayed.

Case where the Preview Image Cannot be Displayed Due to Insufficient Space

In a case where the preview image is not being created, the CPU 11 presents the reason why the preview image cannot be created to the user terminal 20C. For example, in a case where the CPU 11 refers to the drawer DB 113 and determines that the preview image cannot be created because the size exceeds the free space of the drawer, the CPU 11 presents the reason why the preview image cannot be displayed to the user terminal 20C. The message in this case is, for example, "Preview image creation has failed because the drawer has insufficient free space. The preview image cannot be displayed. Re-create the file after securing sufficient free space." Further, for example, in a case where the CPU 11 refers to the cabinet DB 112 and determines that the preview image cannot be created because the size exceeds the free space of the cabinet, the CPU 11 presents the reason why the preview image cannot be displayed to the user terminal 20C. The message in this case is, for example, "Preview image creation has failed because the cabinet has insufficient free space. The preview image cannot be displayed. Re-create the file after securing sufficient free space."

In a case where it is not possible to create a preview image because the cabinet or drawer has insufficient free space, it is possible to create a preview image by increasing the free space in the cabinet or drawer by deleting unnecessary data. Therefore, in a case where the CPU 11 cannot create a preview image because the cabinet or drawer has insufficient free space, the CPU 11 presents a user interface for allowing reception of a preview image creation instruction to the user terminal 20C.

Case where the Preview Image Cannot be Displayed Because the File Size Exceeds the Upper Limit In a case where the cabinet or drawer has not insufficient free space, but the file size of the document data exceeds the upper limit of the size at which the preview image can be created, the CPU 11 presents the reason why the preview image cannot be displayed to the user terminal 20C. The upper limit value of the file size of document data for which a preview image can be created may be set in the office setting DB 111, for example. The message in this case is, for example, "Preview image cannot be displayed because the file size of the document exceeds the upper limit".

Case where the Preview Image Cannot be Displayed Because the Preview Image has not been Created in the Past In a case where the file size of the document data does not exceed the upper limit of the size at which a preview image can be created, the CPU 11 determines whether the document data has never been created in the past, or has failed in preview image creation in the past. The history of preview image creation may be stored in the preview image DB 115, for example.

In a case of the document data of which preview image has never been created in the past, the CPU 11 determines whether or not the document data is of a content-type capable of creating a preview image. In a case where the document data is of a content-type capable of creating a preview image, the CPU 11 presents to the user terminal 20C the reason why the preview image cannot be displayed. The message in this case is, for example, "Preview image cannot be displayed because the preview image has not been created". Further, in a case where the document data of a content type capable of creating a preview image is designated, the CPU 11 presents a user interface for allowing reception of a preview image creation instruction to the user terminal 20C.

On the other hand, in a case where the document data is not of a content-type capable of creating a preview image, the CPU 11 presents to the user terminal 20C the reason why the preview image cannot be displayed. The message in this case is, for example, "Preview image cannot be displayed because of an incompatible content type".

In a case where the document data has failed in executing the preview image creation in the past, the CPU 11 determines whether or not the document data is of a content-type capable of creating a preview image. In a case where the document data is of a content-type capable of creating a preview image, the CPU 11 presents to the user terminal 20C the reason why the preview image cannot be displayed. The message in this case is, for example, "Preview image cannot be displayed because the creation of the preview image has failed". Further, in a case where the document data of a content type capable of creating a preview image is designated, the CPU 11 presents a user interface for allowing reception of a preview image creation instruction to the user terminal 20C.

On the other hand, in a case where the document data is not of a content-type capable of creating a preview image, the CPU 11 presents to the user terminal 20C the reason why the preview image cannot be displayed. The message in this case is, for example, "Preview image cannot be displayed because data not compatible with preview image display is included".

In a case where the CPU 11 does not present a user interface for allowing reception of a preview image creation instruction to the user terminal 20C in the determination processing described above, the CPU 11 presents a user interface for not allowing reception of a preview image creation instruction, to the user terminal 20C.

The order of the determination processing by the CPU 11 is not limited to that described above. For example, the CPU 11 may determine whether the user has the right to access the preview image, after determining whether the display of the preview image of the drawer is valid.

A specific example of the determination processing described above will be described with reference to DBs shown in FIGS. 4 to 8.

It is assumed that user C uses the user terminal 20C to request display of a preview image for the document data with document identifier "doc001". The CPU 11 refers to the document DB 114 and acquires that the drawer storing the document data with the document identifier "doc001" is "drawer001". The CPU 11 refers to the drawer DB 113 and acquires that the preview display of "drawer001" is "invalid". Therefore, the CPU 11 presents a message such as "Preview image cannot be displayed because the display of the preview image in the drawer is invalid" to the user terminal 20C. Further, the CPU 11 presents a user interface for not allowing reception of a preview image creation instruction, to the user terminal 20C.

It is assumed that user C uses the user terminal 20C to request display of a preview image for the document data with document identifier "doc002". The CPU 11 refers to the document DB 114 and acquires that the drawer storing the document data with the document identifier "doc002" is "drawer002". The CPU 11 refers to the drawer DB 113 and acquires that the preview display of "drawer002" is "valid". The CPU 11 refers to the document DB 114 and acquires that the document data entity having the document identifier "doc002" exists. The CPU 11 refers to the document DB 114 and acquires that the content type of the document identifier "doc002" is "pdf". The CPU 11 refers to the office setting DB 111 and acquires that the pdf file is a display target of the preview image. The CPU 11 refers to the document DB 114 and acquires that the user C has no access right to the document data with the document identifier "doc002". Therefore, the CPU 11 presents a message such as "Preview image cannot be displayed because there is no access right" to the user terminal 20C. Further, the CPU 11 presents a user interface for not allowing reception of a preview image creation instruction, to the user terminal 20C.

It is assumed that user C uses the user terminal 20C to request display of a preview image for the document data with document identifier "doc003". The CPU 11 refers to the document DB 114 and acquires that the drawer storing the document data with the document identifier "doc003" is "drawer002". The CPU 11 refers to the drawer DB 113 and acquires that the preview display of "drawer002" is "valid". The CPU 11 refers to the document DB 114 and acquires that the document data entity having the document identifier "doc003" exists. The CPU 11 refers to the document DB 114 and acquires that the content type of the document data with the document identifier "doc003" is "pdf". The CPU 11 refers to the office setting DB 111 and acquires that the pdf file is a display target of the preview image. The CPU 11 refers to the document DB 114 and acquires that the user C has an access right to the document data with the document identifier "doc003". The CPU 11 refers to the preview image DB 115 and acquires that the preview image data with the document identifier "doc003" is "not created (not being created)". The CPU 11 refers to the drawer DB 113 and acquires that the free space of the drawer 002 is "absence (insufficient)". Therefore, the CPU 11 presents, to the user terminal 20C, a message such as "Preview image creation has failed because the drawer has insufficient free space. The preview image cannot be displayed. Re-create the file after securing sufficient free space." Further, the CPU 11 presents a user interface for allowing reception of a preview image creation instruction to the user terminal 20C.

Next, an example of a user interface provided by the document management server 10 to the user terminal 20 is shown.

FIGS. 10 to 14 are diagrams illustrating an example of a user interface provided by the document management server 10 to the user terminal 20. The CPU 11 provides the user terminal 20 with a user interface including a folder display area 210, a list display area 220, and a preview image display area 230.

The folder display area 210 is an area for displaying a list of folders managed in a tree structure by the document management server 10. The list display area 220 is an area for displaying a list of document data stored in each folder. In a case where the user selects a folder displayed in the folder display area 210, the CPU 11 displays a list of document data stored in the folder in the list display area 220.

Figure 10:
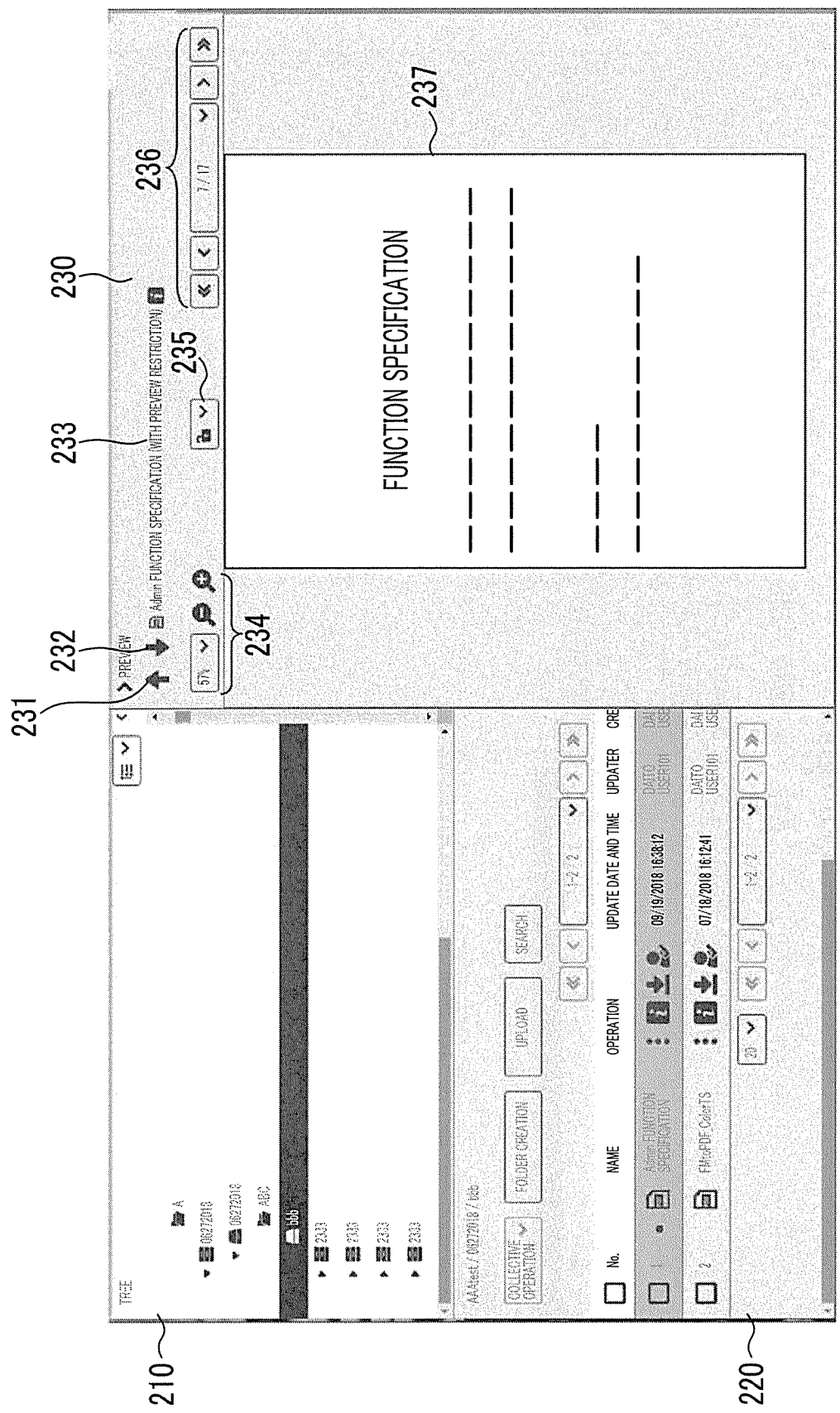
FIG. 10 is a diagram illustrating an example of a user interface provided by the document management server to a user terminal.

The preview image display area 230 is an area for displaying a preview image of the document data displayed in the list display area 220 and selected by the user. FIG. 10 shows an example in which a preview image 237 of the document data "No. 1" selected by the user from the list of document data displayed in the list display area 220 is displayed in the preview image display area 230.

In the preview image display area 230, a button 231 for receiving movement to the previous document data, a button 232 for receiving movement to the next document data, a name display portion 233 for displaying the name of the document data, an enlargement ratio changing portion 234 for receiving a change in the enlargement ratio of the preview image, an editing restriction portion 235 for selecting whether to restrict editing of document data, a page changing portion 236 for receiving a change of the page to be previewed, and a preview image 237 of the document data selected in the list display area 220 are displayed.

Figure 11:
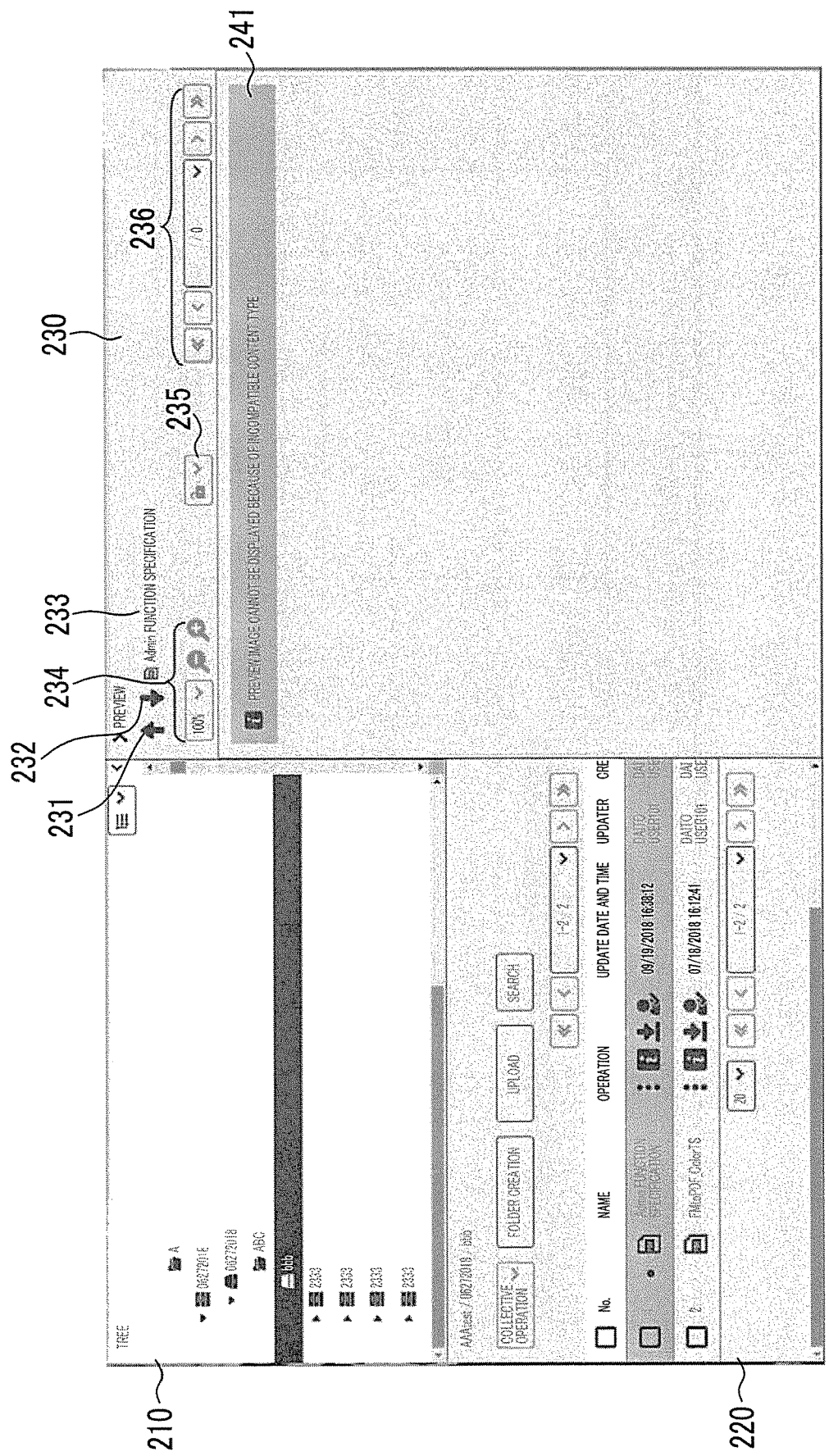
FIG. 11 is a diagram illustrating an example of a user interface provided by the document management server to the user terminal.
Figure 12:
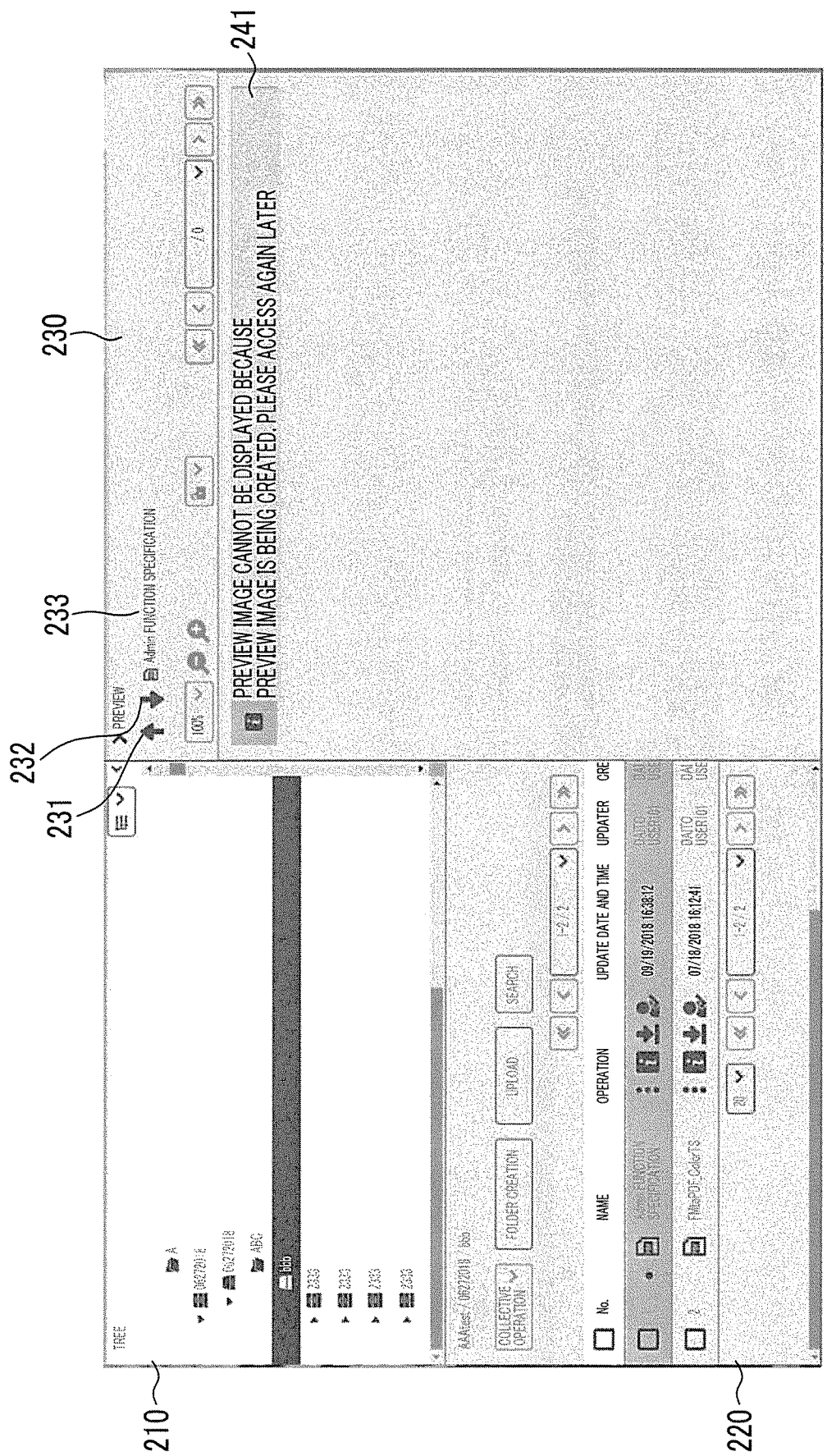
FIG. 12 is a diagram illustrating an example of a user interface provided by the document management server to the user terminal.

As described above, the preview image may not be displayed for various reasons. Therefore, in a case where the preview image cannot be displayed, the CPU 11 displays the reason why the preview image cannot be displayed in the preview image display area 230 as the non-display reason. FIG. 11 shows an example in which the non-display reason 241 is displayed in the preview image display area 230. FIG. 11 shows an example in which the non-display reason 241 indicates that the preview image of the document data selected by the user cannot be displayed because of the content type not compatible with preview image display. Further, FIG. 12 shows an example in which the non-display reason 241 indicates that the preview image of the document data selected by the user cannot be displayed because the preview image is being created.

Even in a case where the preview image cannot be displayed, the user may be able to create a preview image as described above. In such a case, the CPU 11 displays a user interface for allowing reception of a preview image creation instruction in the preview image display area 230.

Figure 13:
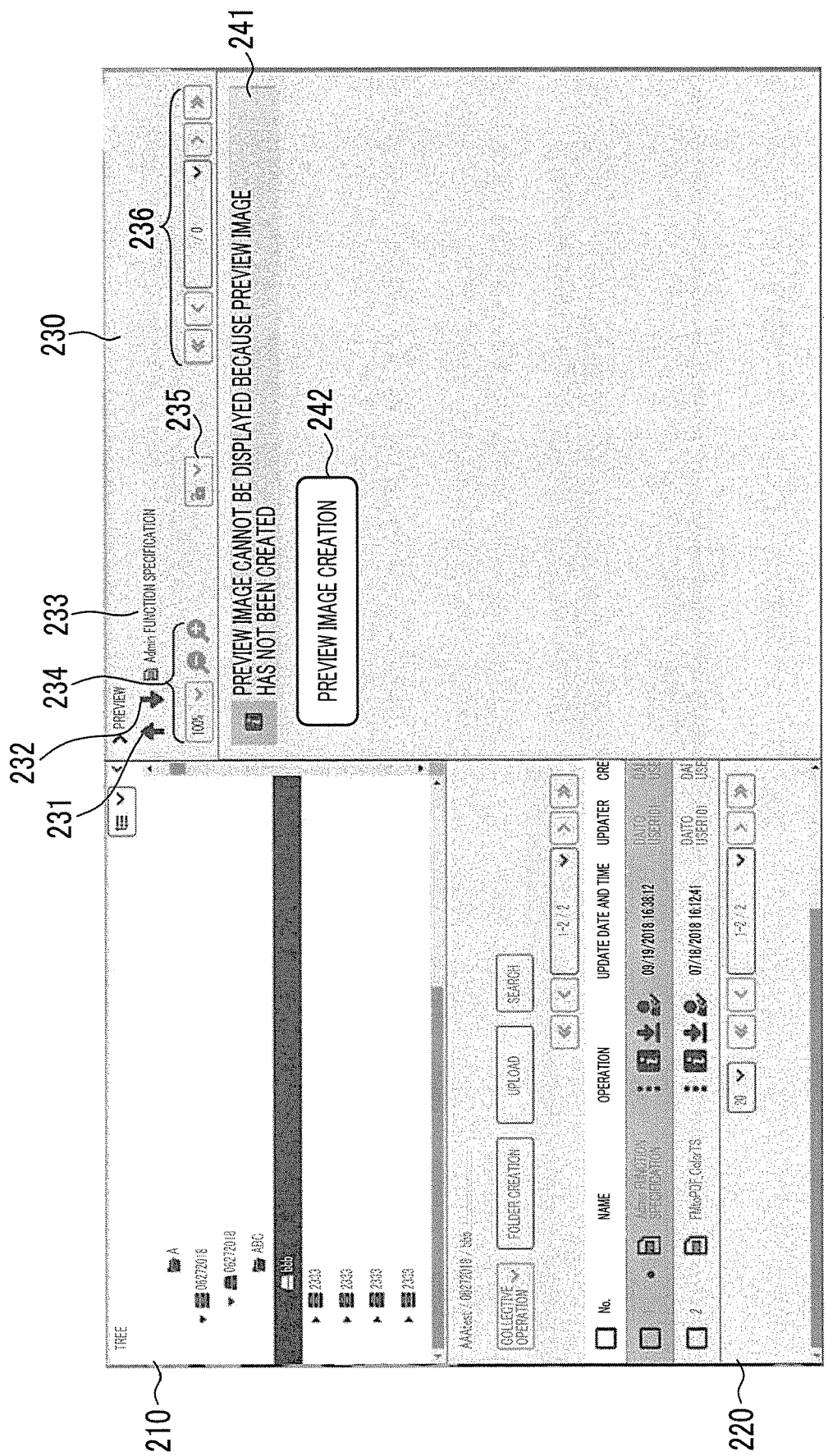
FIG. 13 is a diagram illustrating an example of a user interface provided by the document management server to the user terminal.

FIG. 13 shows an example in which the non-display reason 241 indicates that the preview image of the document data selected by the user cannot be displayed because the preview image has not been created. FIG. 13 shows an example in which a button 242 receiving a preview image creation instruction from the user is displayed in the preview image display area 230.

Figure 14:
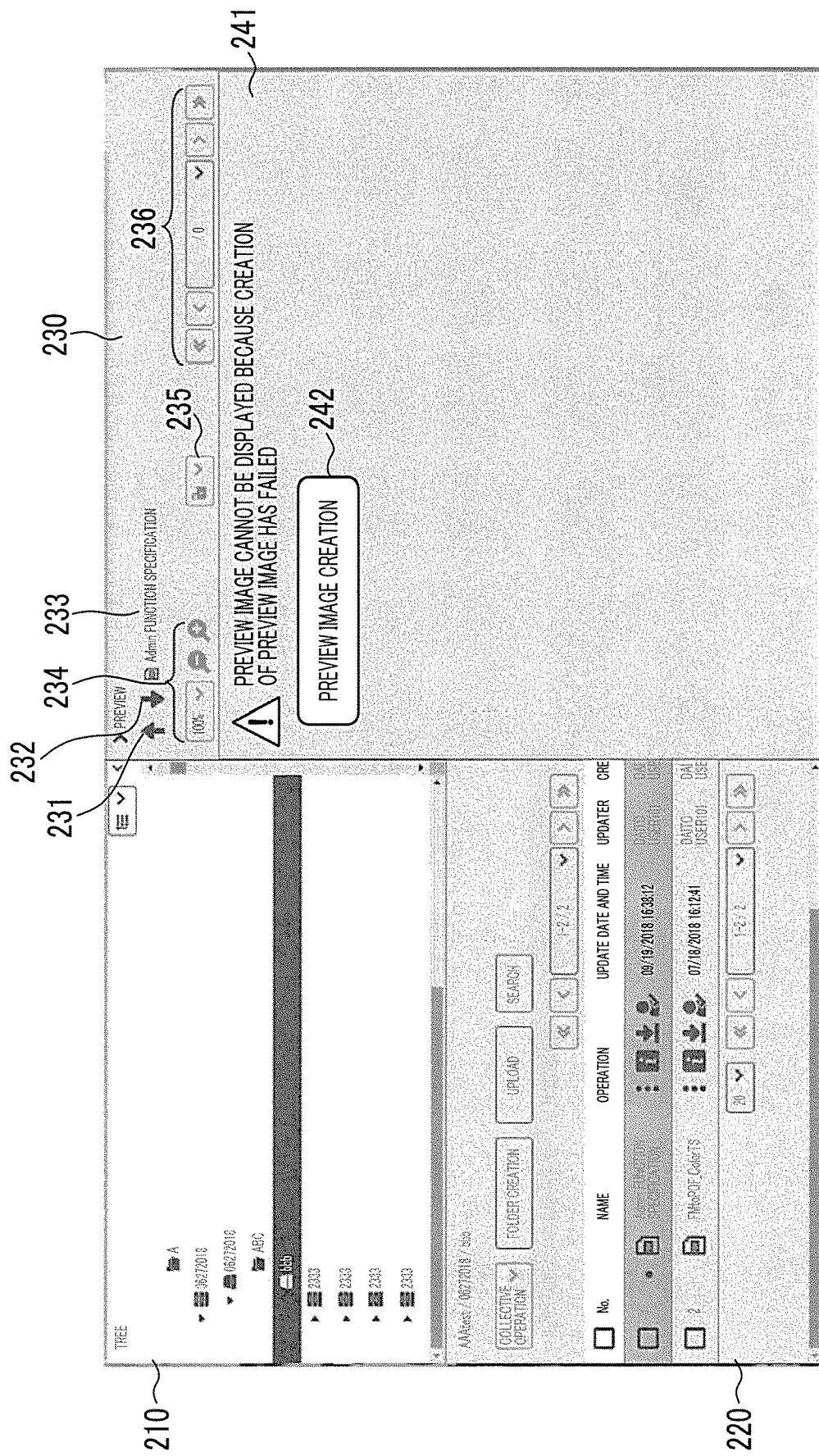
FIG. 14 is a diagram illustrating an example of a user interface provided by the document management server to the user terminal.

FIG. 14 shows an example in which the non-display reason 241 indicates that the preview image of the document data selected by the user cannot be displayed because the creation of the preview image has failed. FIG. 14 shows an example in which a button 242 receiving a preview image creation instruction from the user is displayed in the preview image display area 230.

Figure 15:
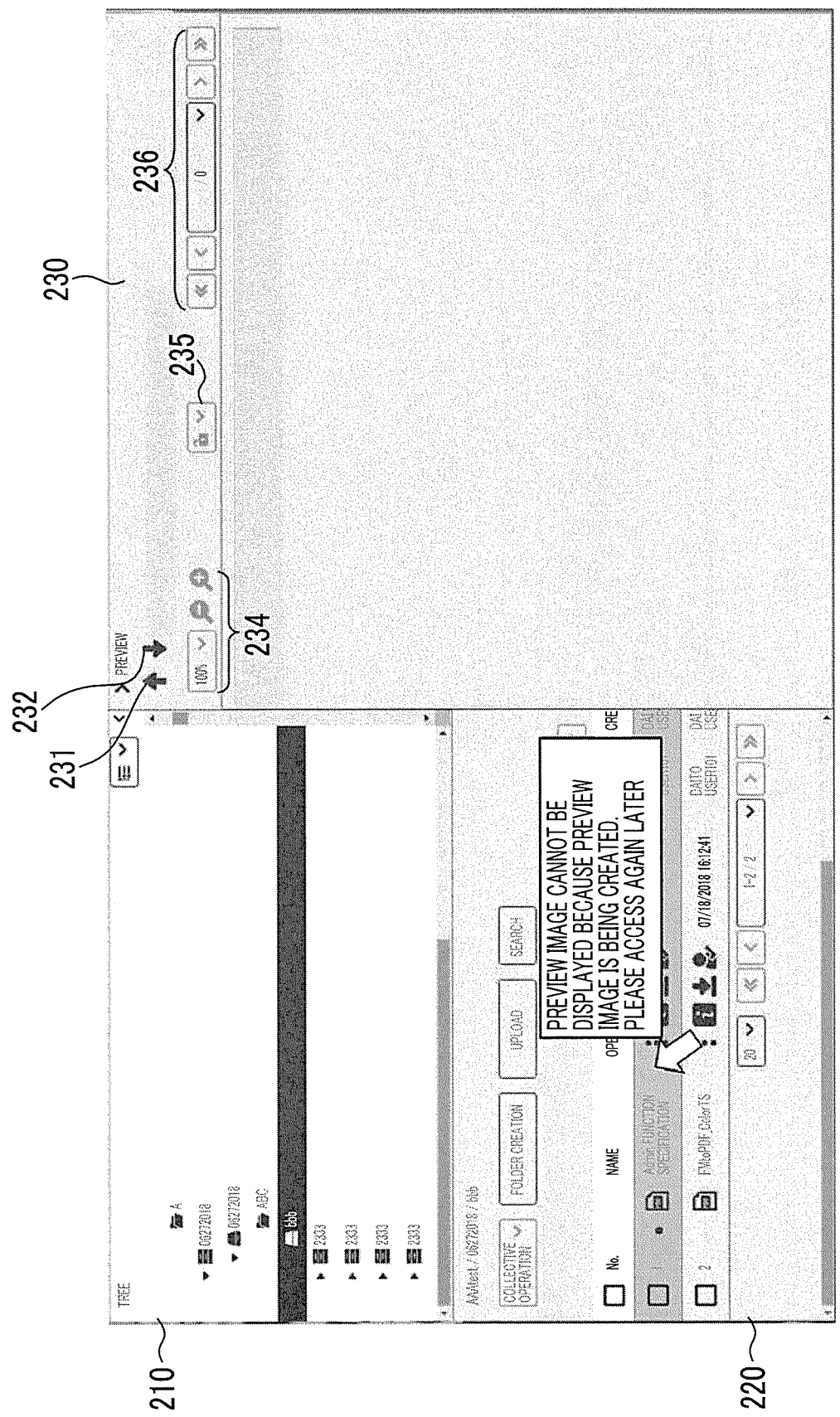
FIG. 15 is a diagram illustrating an example of a user interface provided by the document management server to the user terminal.

In a case where the user cannot display the preview image, and for example, the user moves the mouse cursor to a row of document data displayed in the list display area 220, the CPU 11 may display the reason why the preview image is not displayed, in a so-called pop-up format. FIG. 15 is a diagram illustrating an example of a user interface provided by the document management server 10 to the user terminal 20. FIG. 15 shows an example in which the reason for non-display is displayed in a pop-up format in a case where the user moves the mouse cursor 251 to a certain row in the document data list. In this case, the user can recognize whether or not the preview image for the document data cannot be displayed simply by moving the mouse cursor to the document data list.

In a case where the user can create a preview image, for example, the CPU 11 may display a button for receiving creation of a preview image next to the file name of the document data displayed in the list display area 220.

Next, a use case example of the document management system according to the present exemplary embodiment will be described.

The system administrator prohibits the preview function and does not create a preview image in order to save the space, in the drawer A whose drawer identifier is "drawer001". Thereafter, since a work of updating the attribute of the document data while simply checking the contents of the document data with the preview image becomes necessary, the system administrator switches the preview function to be available in the drawer A. In addition, the system administrator appropriately set the access right for each document, and performs control such that only authorized users can view the preview image of the document data.

Under such a premise, the user C uses the user terminal 20 to operate the user interface shown in FIG. 10 and select any document data. Since a preview image has not been created for each piece of document data in this time point, the CPU 11 acquires the message "Preview image cannot be displayed because the preview image has not been created" as a reason why the preview image cannot be displayed. Further, the CPU 11 acquires this reason as an input, and acquires an output that allows reception of a preview image creation instruction from the user. The CPU 11 presents the acquired message and button 242 to the user terminal 20.

The user C presses the button 242 displayed on the user terminal 20. In response to the user C pressing the button 242, the CPU 11 acquires document data from the document DB 114 and creates preview image data. Then, the CPU 11 stores the created preview image data in the preview image DB 115.

Thereafter, the user C uses the user terminal 20 again to select any document data. The CPU 11 checks that the reason for non-display of the preview image cannot be acquired, that is, the preview image can be displayed, and acquires the preview image of the target document from the preview image DB 115. Then, the CPU 11 presents the acquired preview image to the user terminal 20.

The document management server 10 has the above-described configuration, and the degree of freedom in viewing the preview image can be improved by performing the above-described operation, compared to the case where the user can view only the preview image prepared in advance. The document management server 10 can secure a minimum necessary space for a preview image as a whole service, and can display a preview image of necessary document data. Further, in a case where the user wants to view a preview image, the document management server 10 can provide a user interface that can be operated such that the preview image can be viewed on the spot when the preview image can be created.

The present exemplary embodiment is configured such that the non-display reason determination unit 105 determines the reason why the preview image is not displayed, and transmits the reason why the preview image is not displayed to the preview display unit 104, but the present invention is not limited to such an example. The reason why the preview image is not displayed may be stored as an attribute of each document data in the document DB 114. In a case where the reason why the preview image is not displayed is stored in the document DB 114, the preview display unit 104 may acquire the reason from the document DB and output the reason to the user terminal 20.

In the present exemplary embodiment, document data has been described as an example of content data, but the present invention is not limited to such an example. The technology according to the present invention can be similarly applied to still image data, moving image data, music data, or other digital data, as content data. A preview image in the case of still image data can be an image with a reduced resolution or number of pixels. The preview image in the case of moving image data can be an image in any scene. A preview image in the case of music data can be a jacket image of the music.

Note that the various types of processors other than the CPU may execute the preview image display processing executed by the CPU reading and executing the software (program) in each of the above exemplary embodiments. As a processor in this case, a programmable logic device (PLD) such as a field-programmable gate array (FPGA), whose circuit configuration can be changed after manufacturing, and a dedicated electric circuit, which is a processor such as application specific integrated circuit (ASIC), having a circuit configuration designed exclusively for executing specific circuit processing are exemplified. Further, the preview image display processing may be executed by one of these various processors, or a combination of two or more processors of the identical type or different types (for example, a combination of a plurality of FPGAs, and a combination of a CPU and an FPGA). Further, the hardware structure of these various processors is more specifically an electric circuit in which circuit elements such as semiconductor elements are combined.

In each of the above-described exemplary embodiments, the aspect in which the preview image display processing program is stored (installed) in advance in the ROM or storage has been described. However, the present invention is not limited to this. The program may be provided in a form recorded on a recording medium such as a compact disk read only memory (CD-ROM), a digital versatile disk read only memory (DVD-ROM), or a universal serial bus (USB) memory. Further, programs may be downloaded from an external device through a network.

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
initiate a viewing of a preview image used for previewing content data,
determine that the preview image cannot be displayed after having determined that a previous generation of the preview image has failed during the initiate of the viewing or the preview image has never been generated in response to the initiate of the viewing,
determine a cause for the preview image cannot be displayed and select a respective reason out of multiple reasons as the reason matches the cause for the preview image cannot be displayed,
present the reason why there is no preview image by displaying the respective reason which at least describes the preview image corresponding to the content data not having been displayed, in response to receiving an operation related to display of the preview image for the content data which the preview image has not been displayed, and
allow a reception of a preview image creation instruction from a user, for content data which does not have the preview image and satisfies a first condition, wherein determine the cause for the preview image cannot be displayed and select the respective reason out of the multiple reasons comprising:
present the reason why the preview image cannot be displayed by selecting the respective reason out of the multiple reasons to be displayed, as each of the multiple reasons are expressed as different text strings, wherein each of the multiple reasons are selected to be expressed as the different text strings comprising:
in a case where the preview image cannot be displayed because a corresponding content data does not exist, display the reason as a text string stating that the preview image cannot be displayed because the content data does not exist, in a case where the preview image cannot be displayed because the preview image has not been created, display the reason as a text string stating that the preview image cannot be displayed because the preview image has not been created, in a case where the preview image cannot be displayed because of insufficient volatile memory space or permanent storage space, and display the reason as a text string stating that the preview image cannot be displayed because of insufficient volatile memory space or insufficient permanent storage space.

2. The information processing apparatus according to claim 1,
wherein the content data satisfying the first condition is content data of which the preview image has not been created and the preview image can be displayed and generated.

3. The information processing apparatus according to claim 2, wherein the content data satisfying the first condition is content data stored in an area where display of the preview image is valid.

4. The information processing apparatus according to claim 2, wherein the content data satisfying the first condition is content data of a type that permits creation of the preview image, as a display target of the preview image.

5. The information processing apparatus according to claim 2, wherein content data satisfying the first condition is content data for which a user who has given an instruction to display the preview image is authorized to view the preview image.

6. The information processing apparatus according to claim 1, wherein the processor executes processing of automatically deleting the preview image that satisfies a second condition.

7. The information processing apparatus according to claim 6, wherein the preview image that satisfies the second condition is a preview image generated before a predetermined time range.

8. The information processing apparatus according to claim 6, wherein the preview image that satisfies the second condition is a preview image whose last referenced time is before a predetermined time range.

9. The information processing apparatus according to claim 1, wherein the processor receives an instruction to delete a preview image that satisfies a third condition.

10. The information processing apparatus according to claim 9, wherein the preview image that satisfies the third condition is a preview image that is generated from content data that is a display target of the preview image, and is of a type that permits creation of the preview image.

11. The information processing apparatus according to claim 9, wherein the preview image that satisfies the third condition is a preview image whose last referenced time is before a predetermined time range.

12. The information processing apparatus according to claim 1, wherein the processor executes processing of determining whether or not to generate a preview image for newly registered or updated content data, based on a fourth condition.

13. The information processing apparatus according to claim 12, wherein the fourth condition is to permit generation of the preview image in a case where an area where the content data is stored is an area where the generation of the preview image is permitted.

14. The information processing apparatus according to claim 12, wherein the fourth condition is to permit generation of the preview image, in a case where a free space in an area where the content data is stored is equal to or greater than a threshold.

15. The information processing apparatus of claim 1, wherein allow the reception of a preview image creation instruction from the user, for content data which does not have the preview image and satisfies a first condition comprising:
in response to that there is no preview image and the first condition having been satisfied when an operation related to the display of the preview image is received, display a preview image creation instruction,
receive a user input which conforms is the preview image creation instruction, and
create the preview image which has not been created in response to receiving the user input.

16. The information processing apparatus of claim 15, wherein the reason why the preview image is not created is displayed along the preview image creation instruction on a same screen.

17. An information processing apparatus comprising:
a processor configured to:
initiate a viewing of a preview image used for previewing content data,
determine that the preview image cannot be displayed after having determined that a previous generation of the preview image has failed during the initiate of the viewing or the preview image has never been generated in response to the initiate of the viewing,
determine a cause for the preview image cannot be displayed and select a respective reason out of multiple reasons as the reason matches the cause for the preview image cannot be displayed,
present the reason why the preview image cannot be displayed by displaying the respective reason which at least describes the preview image not being able to be displayed, in response to receiving an operation related to display of the preview image for the content data for which the preview image cannot be displayed,
allow a reception of a preview image creation instruction from a user, for content data for which the preview image cannot be displayed and which satisfies a first condition, and create the preview image in response to the reception of the preview image creation instruction from the user, wherein present the reason why the preview image cannot be displayed and select the respective reason out of the multiple reasons comprising:
present the reason why the preview image cannot be displayed by selecting the respective reason out of the multiple reasons to be displayed, as each of the multiple reasons are expressed as different text strings, wherein each of the multiple reasons are selected to be expressed as the different text strings comprising:
in a case where the preview image cannot be displayed because a corresponding content data does not exist, display the reason as a text string stating that the preview image cannot be displayed because the content data does not exist, in a case where the preview image cannot be displayed because the preview image has not been created, display the reason as a text string stating that the preview image cannot be displayed because the preview image has not been created, in a case where the preview image cannot be displayed because of insufficient volatile memory space or permanent storage space, and display the reason as a text string stating that the preview image cannot be displayed because of insufficient volatile memory space or insufficient permanent storage space.

18. The information processing apparatus according to claim 17,
wherein the content data satisfying the first condition is content data of which the preview image has not been created and the preview image can be displayed and generated.

19. The information processing apparatus according to claim 18,
wherein the content data satisfying the first condition is content data stored in an area where display of the preview image is valid.

20. The information processing apparatus according to claim 18,
wherein the content data satisfying the first condition is content data of a type that permits creation of the preview image, as a display target of the preview image.

21. A non-transitory computer readable medium storing a program causing a computer to:
initiate a viewing of a preview image used for previewing content data,
determine that the preview image cannot be displayed after having determined that a previous generation of the preview image has failed during the initiate of the viewing or the preview image has never been generated in response to the initiate of the viewing,
determine a cause for the preview image cannot be displayed and select a respective reason out of multiple reasons as the reason matches the cause for the preview image cannot be displayed,
present the reason why the preview image cannot be displayed by displaying the respective reason which at least describes the preview image not being able to be displayed, in response to receiving an operation related to display of the preview image for the content data for which the preview image has not been displayed, and
allow a reception of a preview image creation instruction from a user, for content data for which the preview image cannot be displayed and which satisfies a first condition, and create the preview image in response to the reception of the preview image creation instruction from the user, wherein determine the cause for the preview image cannot be displayed and select the respective reason out of multiple reasons comprising:
present the reason why the preview image cannot be displayed by selecting the respective reason out of the multiple reasons to be displayed, as each of the multiple reasons are expressed as different text strings, wherein each of the multiple reasons are selected to be expressed as the different text strings comprising:
in a case where the preview image cannot be displayed because a corresponding content data does not exist, display the reason as a text string stating that the preview image cannot be displayed because the content data does not exist, in a case where the preview image cannot be displayed because the preview image has not been created, display the reason as a text string stating that the preview image cannot be displayed because the preview image has not been created, in a case where the preview image cannot be displayed because of insufficient volatile memory space or permanent storage space, and display the reason as a text string stating that the preview image cannot be displayed because of insufficient volatile memory space or insufficient permanent storage space.

* * * * *